US010003581B2

(12) United States Patent
Polo et al.

(10) Patent No.: US 10,003,581 B2
(45) Date of Patent: Jun. 19, 2018

(54) SECURE CONNECTION ESTABLISHMENT (71) Applicant: Broadcom Corporation, Irvine, CA (US)

(72) Inventors: Angel Arturo Polo, Solana Beach, CA (US); Guoxin Xie, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 292 days.

(21) Appl. No.: 14/590,949

(22) Filed: Jan. 6, 2015

(65) Prior Publication Data

US 2016/0165649 A1    Jun. 9, 2016

Related U.S. Application Data (60) Provisional application No. 62/089,800, filed on Dec. 9, 2014.

(51) Int. Cl.
H04L 29/06 (2006.01)
H04W 4/80 (2018.01)
(Continued)

(52) U.S. Cl.
CPC ...... *H04L 63/0428* (2013.01); *H04L 63/0492* (2013.01); *H04W 4/80* (2018.02);
(Continued)

(58) Field of Classification Search
CPC ..... H04L 29/006; H04L 9/32; H04L 63/0428; H04L 45/74; H04L 63/0492; H04W 12/02;
(Continued)

(56) References Cited

U.S. PATENT DOCUMENTS 7,400,733 B1 *  7/2008  Cam-Winget ......... H04L 63/06
                                                 380/270
9,032,501 B1 *  5/2015  Martin ................. H04L 9/3213
                                                 713/155
(Continued)

OTHER PUBLICATIONS

Bluetooth Sig Proprietary, Specification of the Bluetooth System, Version 4.0, Jun. 30, 2010, 2302 pgs.; https://www.bluetooth.org/en-us/specification/adopted-specifications (in two parts).
(Continued)

*Primary Examiner* — Brandon J Miller
(74) *Attorney, Agent, or Firm* — McDermott Will & Emery LLP (57) ABSTRACT A wireless device implementing secure connection establishment may include at least one processor circuit. The at least one processor circuit may be configured to receive an advertising packet from a device over a first channel and generate, in response to receiving the advertising packet, a connection request packet that comprises control information for establishing a connection with the device over a second channel. The at least one processor circuit may be further configured to encrypt and authenticate at least a portion of the connection request packet based at least in part on a connection entry key previously exchanged with the device and transmit the at least partially encrypted connection request packet over the first channel. The at least one processor circuit may be further configured to establish the connection with the device over the second channel based at least in part on the control information of the connection request packet.

20 Claims, 7 Drawing Sheets (51) Int. Cl.
*H04W 12/02* (2009.01)
*H04W 12/06* (2009.01)
*H04W 84/18* (2009.01)
*H04W 8/00* (2009.01)
*H04L 12/741* (2013.01)

(52) U.S. Cl.
CPC .......... *H04W 12/02* (2013.01); *H04W 12/06* (2013.01); *H04L 45/74* (2013.01); *H04W 8/005* (2013.01); *H04W 84/18* (2013.01)

(58) Field of Classification Search
CPC ... H04W 12/06; H04W 76/021; H04W 4/008; H04W 4/80; H04W 84/18; H04W 8/005
See application file for complete search history.

(56) References Cited

U.S. PATENT DOCUMENTS

| | | | | |
|---|---|---|---|---|
| 9,326,239 | B2* | 4/2016 | Polo | H04W 52/0216 |
| 9,497,691 | B2* | 11/2016 | Seok | H04W 48/16 |
| 2005/0154896 | A1* | 7/2005 | Widman | H04L 9/12 |
| | | | | 713/182 |
| 2005/0276418 | A1* | 12/2005 | Hagiwara | H04L 9/32 |
| | | | | 380/270 |
| 2013/0259230 | A1 | 10/2013 | Polo et al. | |
| 2013/0273851 | A1* | 10/2013 | Preiszler | H04W 4/008 |
| | | | | 455/41.2 |
| 2014/0055243 | A1 | 2/2014 | Kerai | |
| 2015/0201446 | A1* | 7/2015 | Linsky | H04W 76/025 |
| | | | | 370/329 |
| 2016/0021192 | A1* | 1/2016 | Passichenko | H04L 63/0428 |
| | | | | 713/168 |
| 2016/0150352 | A1* | 5/2016 | Saed | H04W 4/80 |
| | | | | 455/41.2 |

OTHER PUBLICATIONS

Bluetooth Sig Proprietary, Specification of the Bluetooth System, Version 4.1, Dec. 3, 2013, 2684 pgs.; https://www.bluetooth.org/en-us/specification/adopted-specifications (in two parts).
Bluetooth Sig Proprietary, Specification of the Bluetooth System, Version 4.2, Dec. 2, 2014, 2772 pgs.; https://www.bluetooth.org/en-us/specification/adopted-specifications (in two parts).
Mikhaylov, "Accelerated Connedon Establishment (ACE) Mechanism for Bluetooth Low Energy," 2014 IEEE International Symposium on Personal Indoor and Mobile Radio Communication (MUIRC), Sep. 2014, p. S1264-S1268.
Wang, "Bluetooth Low Energy—privacy enhancement for advertisement," Jun. 2014, Master's Thesis—Norwegian University of Science and Technology.

* cited by examiner

SECURE CONNECTION ESTABLISHMENT

CROSS-REFERENCE TO RELATED APPLICATIONS

The present application claims the benefit of U.S. Provisional Patent Application Ser. No. 62/089,800, entitled "Secure Connection Establishment," filed on Dec. 9, 2014, which is hereby incorporated by reference in its entirety for all purposes.

TECHNICAL FIELD

The present description relates generally to secure connection establishment including Bluetooth Low Energy (BLE) secure connection establishment.

BACKGROUND

Bluetooth Low Energy technology is a wireless network technology having applications in healthcare, fitness, security, and home entertainment industries, as well other industries. BLE technology permits a wireless device to establish a connection with another wireless device to allow the exchange of packets between the two wireless devices. However, communication between the two wireless devices may be followed by an eavesdropper from the BLE connection establishment. For example, an eavesdropper may discover the connection when the connection is initiated, and the eavesdropper may obtain (e.g. by sniffing) timing and hopping pattern information that would allow the eavesdropper to follow the communications between the two wireless devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
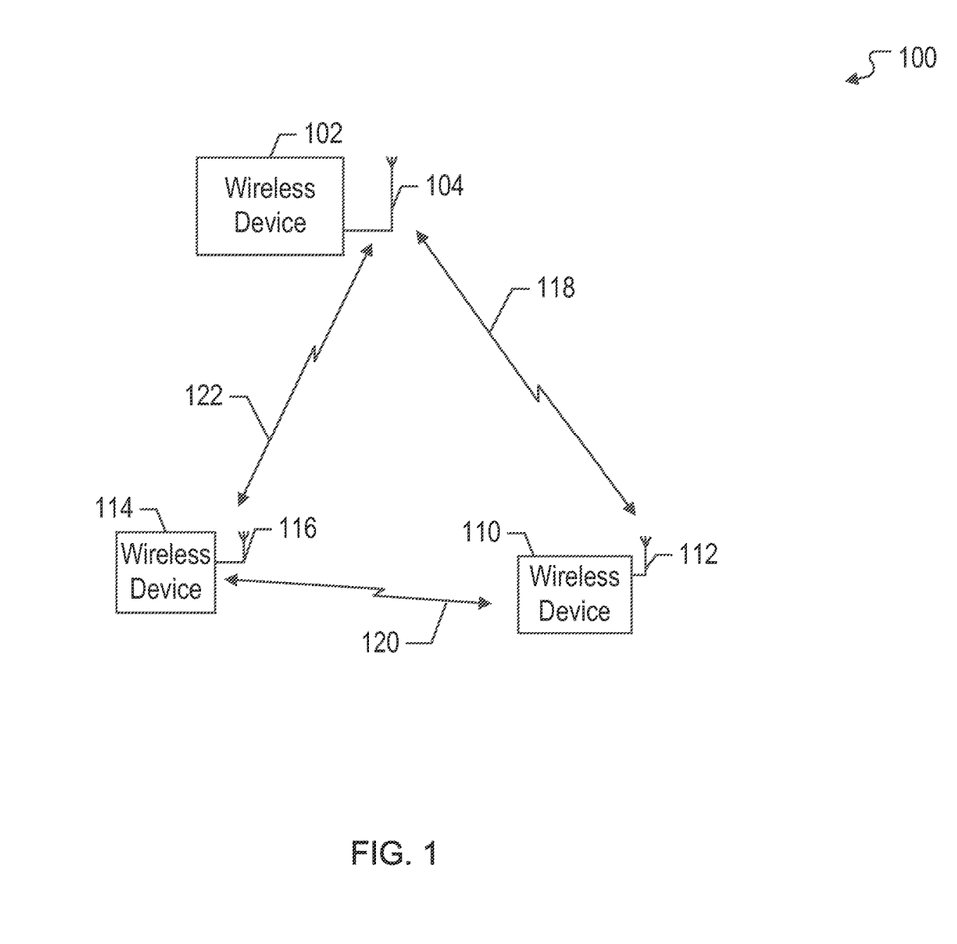
FIG. 1 illustrates an example network environment in which a system for secure connection establishment may be implemented in accordance with one or more implementations.

FIG. 1 illustrates an example network environment 100 in which a system for secure connection establishment may be implemented in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example network environment 100 includes one or more wireless devices 102, 110, 114. The wireless devices 102, 110, 114 may be any device capable of engaging in wireless communications, such as BLE communications, Bluetooth communications, or generally any wireless communications. The wireless devices 102, 110, 114 may each include one or more antennas 104, 112, 116 for communicating with one another and/or other devices. In one or more implementations, the one or more antennas 104, 112, 116 may be internal to the wireless devices 102, 110, 114 and/or may be integrated into a body of the wireless devices 102, 110, 114. The wireless devices 102, 110, 114 may each include one or more processor circuits, as is discussed further below with respect to FIG. 2.

In one or more implementations, the wireless devices 102, 110, 114 may include, by way of non-limiting examples, mobile phones; tablets; computers; wearable devices; electronic payment devices; video game devices; garage doors; garage door openers; alarm panel; light switches; individual interior and exterior lighting; heat, ventilation, and air conditioning (HVAC) systems, home security systems, multimedia devices (e.g., televisions, set top boxes, receivers, etc.), pet tags, appliances (e.g., coffee makers, refrigerators, washing machines, etc.), windows, automatic shades, locks, fitness devices, medical devices, monitoring devices, baby monitor; smoke detectors; carbon monoxide detectors; carbon dioxide detectors; and/or chips embedded within or otherwise coupled to any device.

In one or more implementations, the wireless device 102 may be a smartphone, while the wireless devices 110, 114 may be light sources (or sensors embedded in the light sources). The wireless device 102 may communicate instructions to the wireless devices 110, 114, such as instructions to turn on or off the light sources. In one or more implementations, the wireless device 102 may be any device with a display, while the wireless devices 110, 114 may be health monitoring devices, such as wearable health monitoring devices, (or sensors embedded in the health monitoring devices). In this situation, the wireless devices 110, 114 may provide information associated with a person (e.g., heart rate, glucose levels, temperature, etc.) to the wireless device 102 so that this information can be processed, forwarded, and/or displayed by the wireless device 102.

In one or more implementations, one or more of the wireless devices 102, 110, 114 may operate in accordance with a BLE specification, such as is described in the Bluetooth 4.0, 4.1, and/or 4.2 Standards. In one or more implementations, the wireless devices 102, 110, 114 may operate in accordance with a Bluetooth Basic Rate/Enhanced Data Rate specification, such as is described in the Bluetooth 4.0, 4.1 and/or 4.2 Standards. In one or more implementations, the wireless devices 102, 110, 114 may operate in accordance with other communication protocols, standards and/or specifications. The Specifications of the Bluetooth® System, Versions 4.0, 4.1 and 4.2, published on Jun. 30, 2010, Dec. 3, 2013 and Dec. 2, 2014, respectively, are incorporated herein by reference in their entirety.

In one or more implementations, one or more of the wireless devices 102, 110, 114 may simultaneously establish connections with one or more of the other wireless devices 102, 110, 114. For example, the wireless device 102 may establish a connection 118 with the wireless device 110, as well as simultaneously establishing a connection 122 with the wireless device 114. The connections 118, 122 may be, for example, BLE connections, Bluetooth connections, or any other wireless connections. In order to establish the connections 118, 122, the wireless devices 102, 110, 114 may transmit connection request packets over a first channel, such as an advertising channel and/or an overhead channel, to initiate the connections 118, 122 on one or more second channels, such as data channels. The connection request packets may include control information for initiating the connections 118, 122 on the second channels, such as timing information, hopping pattern information, etc. Thus, an eavesdropping device that is able to intercept the connection request packets on the advertising channel, and access the control information contained therein, may be able to follow the wireless devices 102, 110, 114 to the connections 118, 122 on the data channels. Similar to the wireless device 102, the wireless devices 114, 110 may simultaneously establish connections with other wireless devices shown in FIG. 1 via connections 122, 118 and 120. In one or more implementations, the wireless device 114 may establish a connection 120 (e.g., similar to connection 118 and 122) with the wireless device 110. The connection 120 may be, for example, a BLE connection, a Bluetooth connection, or any other wireless connection.

In one or more implementations, a channel may refer to a discrete frequency, or frequency band, over which the wireless devices 102, 110, 114 communicate. In one or more implementations, the advertising channels may be used by the wireless devices 102, 110, 114 for discovering one another, initiating the connections 118, 122, e.g. via transmission of connection request packets, and/or broadcasting data, while the data channels may be used by the wireless devices 102, 110, 114 for communicating data after establishing the connections 118, 122. In one or more implementations, the advertising channels may operate on different frequencies than the data channels.

In one or more implementations, one or more of the wireless devices 102, 110, 114 may pair and/or bond with one another prior to initiating the establishment of the connections 118, 122. As part of the paring and/or bonding process, the wireless devices 102, 110, 114 may establish a secure link and may exchange one or more keys over the secure link. The wireless devices 102, 110, 114 may use one or more of the exchanged keys to encrypt at least portions of packets transmitted over the advertising channel, such as the connection request packets, in order to secure the establishment of the connections 118, 122 on the data channels. Thus, when the control information of a connection request packet is encrypted, an eavesdropping device that intercepts the connection request packet may be unable to access the control information, and therefore would be unable to follow the wireless devices 102, 110, 114 to the connections 118, 122 on the data channels. Accordingly, the establishment of the connections 118, 122 on the data channels can be secured by encrypting the control information of the connection request packets that are transmitted on the advertising channels.

In one or more implementations, the subject technology may allow for securing Bluetooth Basic Rate/Enhanced Data Rate (BT) connection establishment between two wireless devices to prevent an eavesdropper from obtaining the information required to follow the communications between the wireless devices 102, 110, 114 from the BT connection establishment, such as using the processes described further below with reference to FIGS. 3 and 4. For example, Frequency Hop Synchronization (FHS) packets may be encrypted, e.g. using the processes described below, during paging and/or scanning process to obfuscate the BT address and BT clock information of the wireless devices 102, 110, 114.

Figure 2:
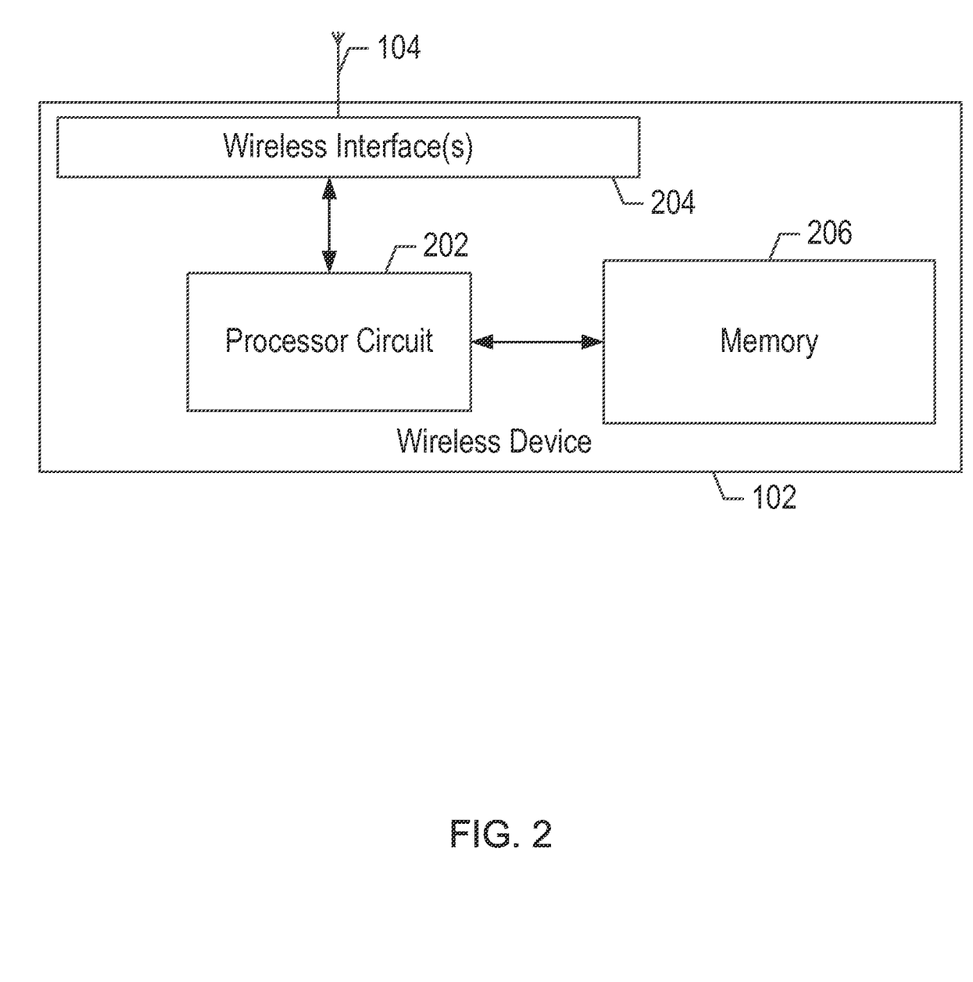
FIG. 2 illustrates an example wireless device in accordance with one or more implementations.

FIG. 2 illustrates an example wireless device 102 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example wireless device 102 includes one or more processor circuits 202, a memory 206, and one or more wireless interfaces 204. The one or more wireless interfaces 204 may facilitate establishing one or more connections 118, 122, such as BLE connections, Bluetooth connections, WiFi connections, or generally any wireless connections. The one or more wireless interfaces 204 may receive signals from, and transmit signals to, other devices (e.g., the wireless device 110 and/or the wireless device 114) via one or more antennas 104. In one or more implementations, the configuration of the wireless device 110 and/or the wireless device 114 may be the same or similar to the configuration of wireless device 102 shown in FIG. 2.

In one or more implementations, one or more of the processor circuit 202, the wireless interfaces 204, and/or the memory 206 may be implemented in software (e.g., subroutines and code). In one or more implementations, one or more of the processor circuit 202, the wireless interfaces 204, and/or the memory 206 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
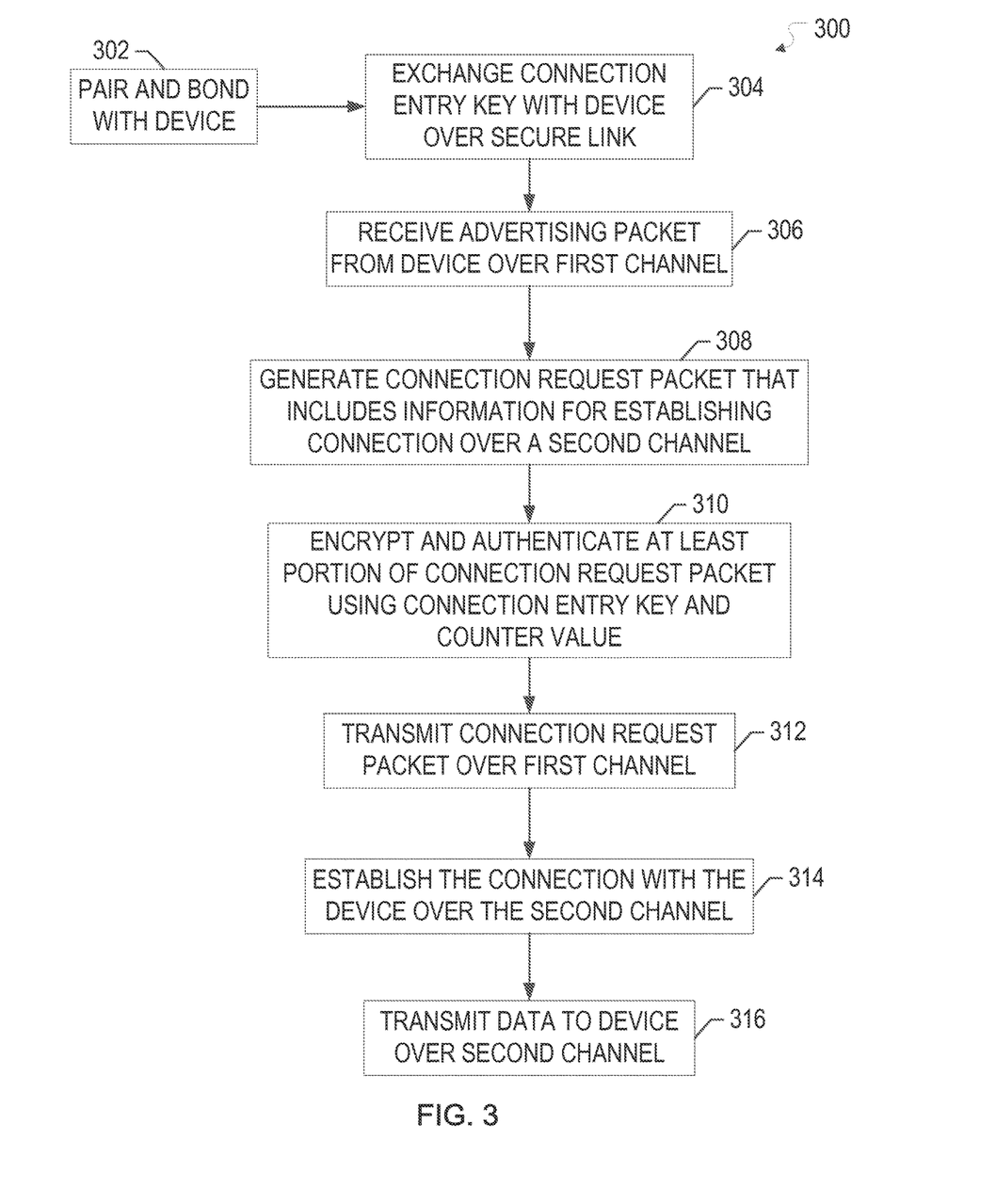
FIG. 3 illustrates a flow diagram of an example process of a wireless device transmitting a connection request in accordance with one or more implementations.

FIG. 3 illustrates a flow diagram of an example process 300 of a wireless device 102 transmitting a connection request in accordance with one or more implementations. For explanatory purposes, the example process 300 is primarily described herein with reference to wireless device 102 of FIGS. 1-2; however, the example process 300 is not limited to the wireless device 102 of FIGS. 1-2, e.g. the example process 300 may be performed by one or more of the wireless devices 110, 114, and/or the example process 300 may be performed by one or more components of the wireless device 102. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The wireless device 102 pairs and/or bonds with one or more other wireless devices, such as the wireless device 110 (302). In one or more implementations, the pairing and/or bonding process may be performed in accordance with a specification, such as a Bluetooth and/or BLE specification. During the bonding process, one or more cryptographic keys, or encryption keys, may be generated via a transport specific key distribution process. In one example, the one or more cryptographic keys may include a link key, such as a BLE link key, and/or a long term key. The wireless devices 102, 110 may establish a secure link, such as an encrypted link, using the link key and/or the long term key. The wireless device 102 then exchanges one or more additional encryption keys, such as a connection entry key, with the wireless device 110 over the secure link (304). In one or more implementations, the one or more additional encryption keys including the connection entry key may be generated and/or exchanged during the transport specific key distribution process. The one or more additional encryption keys may be used in lieu of, and/or in addition to, the link key and/or the long term key. For example, the connection entry key may be used by the wireless device 102 to secure the transmission and/or reception of connection establishment information, such as connection request packets.

In one or more implementations, the aforementioned connection entry key and associated nonce and counter start values, which will be discussed in more details below, may be a key and associated nonce and counter start values that are only shared between the wireless devices 102, 110. Thus, the wireless devices 102, 110 may perform a secure key exchange process for the connection entry key once the secure link is established. In one or more implementations, the secure link may be disconnected and/or closed after exchanging the one or more additional encryption keys.

The wireless device 102 receives an advertising packet from the wireless device 110 over a first channel, such as an advertising channel (306). The advertising packet may indicate that the wireless device 110 is available for establishing a connection 118 with the wireless device 102 on a second channel, such as a data channel. The wireless device 102 generates, in response to receiving the advertising packet (306), a connection request packet that includes control information for establishing the connection 118 on the second channel (308). An example connection request packet, and the control information contained therein, is discussed further below with respect to FIG. 6.

The wireless device 102 encrypts and provides a message authentication code for at least a portion of the connection request packet, such as the control information of the connection request packet, using at least the connection entry key previously exchanged with the wireless device (304), as well as a counter value (310). The counter value may be utilized as part of a nonce for the encryption scheme, such as an AES-CCM (Advanced Encryption Standard Counter with Cipher Block Chaining Message Authentication Code) encryption and authentication scheme. In one or more implementations, the counter value may be a packet sequence number, a connection sequence number, or another sequence number that is synchronized and incremented by the wireless devices 102, 110. Thus, the encryption and authentication scheme used by the wireless devices 102, 110 may be synchronized based at least on the counter value.

In one or more implementations, the encrypted portion of the connection request packet may include, for example, an access address field, a transmit window size field, a transmit window offset field, a channel map field, a hop field, and/or any other fields that may be used for connection establishment. The unencrypted portion of the connection request packet may include, for example, public or random device addresses of the wireless devices 102, 110. In one or more implementations, the access address field of the connection request packet may be prefixed with a counter field that includes the counter value.

The wireless device 102 transmits the at least partially encrypted connection request packet over the first channel to the wireless device 110 (312). Any subsequent packet transmissions between the wireless devices 102, 110 over the first channel, such as communications related to establishing a connection on the second channel, may also be at least partially encrypted and authenticated using the connection entry key. The wireless device 102 establishes a connection 118 with the wireless device 110 over the second channel, such as a data channel, based at least in part on the encrypted control information of the connection request packet (314). The wireless device 102 may then transmit and/or receive data from the wireless device 110 over the second channel (316) via the connection 118.

Figure 4:
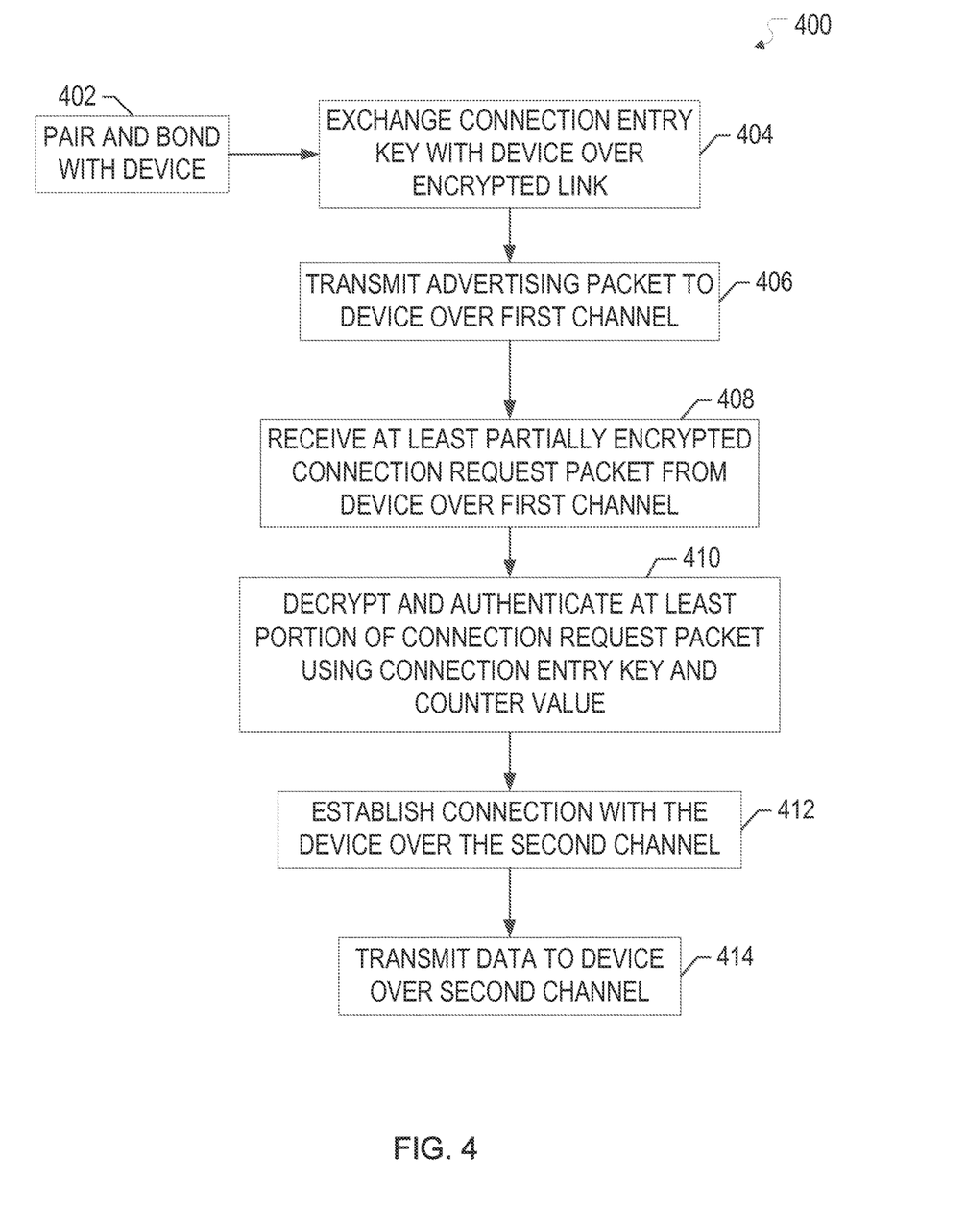
FIG. 4 illustrates a flow diagram of an example process of a wireless device receiving a connection request in accordance with one or more implementations.

FIG. 4 illustrates a flow diagram of an example process 400 of a wireless device 102 receiving a connection request in accordance with one or more implementations. For explanatory purposes, the example process 400 is primarily described herein with reference to wireless device 102 of FIGS. 1-2; however, the example process 400 is not limited to the wireless device 102 of FIGS. 1-2, e.g. the example process 400 may be performed by one or more of the wireless devices 110, 114, and/or the example process 400 may be performed by one or more components of the wireless device 102. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The wireless device 102 pairs and/or bonds with one or more other wireless devices, such as the wireless device 110 (402). During the bonding process, one or more cryptographic keys, or encryption keys, may be generated via a transport specific key distribution process. In one example, the one or more cryptographic keys may include a link key, such as a BLE link key, and/or a long term key. The wireless devices 102, 110 may establish a secure link, such as an encrypted link, using the link key and/or the long term key. The wireless device 102 then exchanges one or more additional encryptions keys, such as a connection entry key and associated nonce and counter start values, with the wireless device 110 over the secure link (404).

The wireless device 102 transmits an advertising packet to the wireless device 110 over a first channel, such as an advertising channel (406). The advertising packet may indicate that the wireless device 102 is available for establishing a connection 118 with the wireless device 110 on a second channel, such as a data channel. The wireless device 102 receives, in response to transmitting the advertising packet (406), an at least partially encrypted connection request packet that includes control information for establishing the connection 118 on the second channel (408). An example connection request packet, and the control information contained therein, is discussed further below with respect to FIG. 6.

The wireless device 102 decrypts and authenticates the at least a portion of the connection request packet, such as the control information of the connection request packet, using at least the connection entry key previously exchanged with the wireless device (404), as well as a counter value (410). The wireless device 102 establishes a connection 118 with the wireless device 110 over the second channel, such as a data channel, based at least in part on the decrypted control information of the connection request packet (412). The wireless device 102 may then transmit and/or receive data from the wireless device 110 over the second channel (414) via the connection 118.

Figure 5:
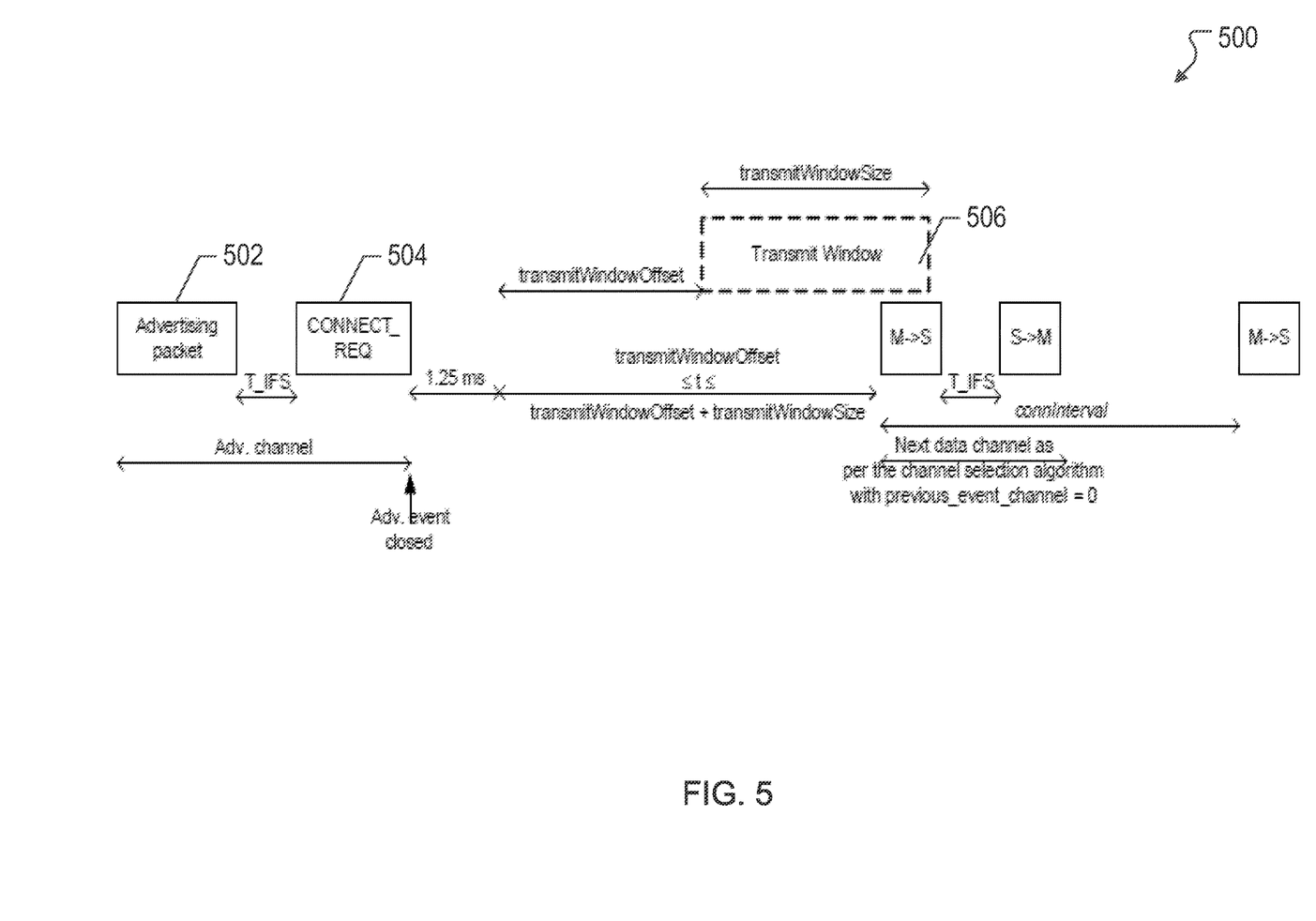
FIG. 5 illustrates an example timing diagram for secure connection establishment in accordance with one or more implementations.

FIG. 5 illustrates an example timing diagram 500 for secure connection establishment in accordance with one or more implementations. In one or more implementations, the timing diagram 500 may reflect operations that are in accordance with a BLE specification, such as the Bluetooth 4.1 Standard. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

In the timing diagram 500, an advertising packet 502 is received at a first time over an advertising channel, such as by the wireless device 102. For example, the wireless device 110 may transmit the advertising packet 502 to the wireless device 102 as part of an advertising event. The wireless device 102 may respond to the advertising packet 502 by transmitting an at least partially encrypted connection request packet (e.g., CONNECT REQ) 504 over the advertising channel to the wireless device 110 at a second time. The connection request packet may include control information for establishing a connection over one of the data channels.

In one or more implementations, after transmitting the connection request packet 504, the advertising event may be closed, and the wireless device 102 may exit the initiating state and transition to a connection state. The wireless device 102 may initiate the connection on one of the data channels based at least in part on the control information contained in the connection request packet. The wireless device 102 may then start to send the first packet over the data channel in the connection state within a transmit window 506. The first packet sent in the connection state by the wireless device 102 may determine the anchor point for the first connection event, and therefore the timings of all future connection events in this connection.

As is described further below with reference to FIG. 6, the connection request packet 504 may include multiple parameters, such as a transmitWindowOffset parameter, a transmitWindowSize parameter, and a connInterval parameter. In one or more implementations, the parameters may be used to determine the start of the first packet in the connection state, such as no earlier than 1.25 milliseconds (ms)+transmitWindowOffset, and no later than 1.25 ms+transmitWindowOffset+transmitWindowSize after transmission of the connection request packet 504 in the advertising channel. In one or more implementations, during the connection state, the wireless devices 102, 110 may alternate transmitting and receiving packets over one or more of the data channels. The connection event may be open while both wireless devices continue to send packets.

Figure 6:
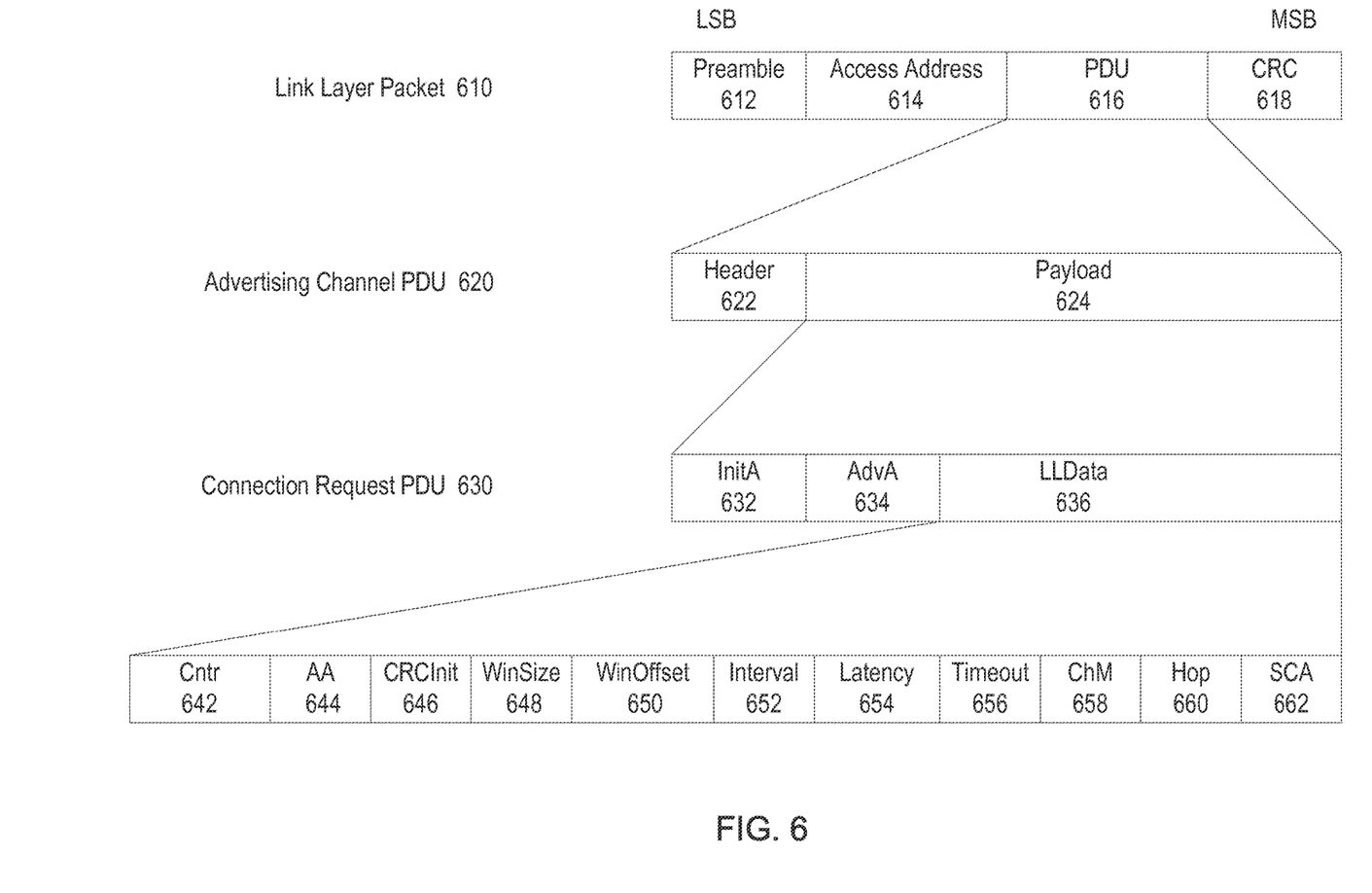
FIG. 6 illustrates an example link layer packet that carries a connection request packet in accordance with one or more implementations.

FIG. 6 illustrates an example link layer packet 610 that carries a connection request packet 630 in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

In one or more implementations, a connection request packet may be carried in a link layer packet 610, such as a BLE link layer packet on either BLE advertising or data channels. The link layer packet 610 may include a preamble field 612, an access address field 614, a protocol data unit (PDU) field 616, and a cyclic redundancy check (CRC) field 618. The PDU field 616 carried in the link layer packet 610 may be an advertising channel PDU 620. In one or more implementations, the preamble field 612 is 1 byte, the access address field 614 is 4 bytes, and the CRC field 618 is 3 bytes. The advertising channel PDU 620 may include a header field 622 and a payload field 624. In one or more implementations, the payload field 624 may carry a connection request PDU 630. The connection request PDU 630 may include an initiator address field 632, denoted as InitA, an advertiser address field 634, denoted as AdvA, and a link layer data field 636, denoted as LLData. The initiator address field 632 may correspond to the address of the device transmitting the connection request PDU 630, while the advertiser address field 634 may correspond to the address of the device receiving the connection request PDU 630.

In one or more implementations, the link layer data field 636 may include control information, such as a counter field 642, denoted as Cntr; an access address field 644, denoted as AA; a CRC initialization field 646, denoted as CRCinit; a transmit window size field 648, denoted as WinSize; a transmit window offset field 650, denoted as WinOffset; an interval field 652, a latency field 654, a timeout field 656, a channel map field 658, denoted as ChM; a hop field 660, denoted as Hop; and/or a sleep clock accuracy field 662, denoted as SCA.

In one or more implementations, the link layer data field 636 may be prefixed with the counter field 642. The counter field 642 can be utilized as part of a nonce (e.g., CCM nonce) for an encryption and message authentication process, such as an AES-CCM encryption and message authentication process. In one or more implementations, the counter field 642 may be the only field in link layer data field 636 that is carried in clear text. Thus, the control information of the connection request PDU 630, i.e. the remaining fields of the link layer data field 636, may be encrypted when the connection request PDU 630 is transmitted.

In one or more implementations, the length and content of the fields shown in FIG. 6 can vary depending on the physical layer that is used. The length of one or more of the fields, such as the preamble field 612, the access address field 614, the header field 622, the initiator address field 632 and the advertiser address field 634, is dependent on the packet structure that is used, and/or the maximum length of the PDU or payload is dependent on the packet structure that is used. Examples of physical layers that can be used include BLE 1-Mbit and BLE 2-Mbit, BLE Long Range, and other data rates, among other physical layers.

Figure 7:
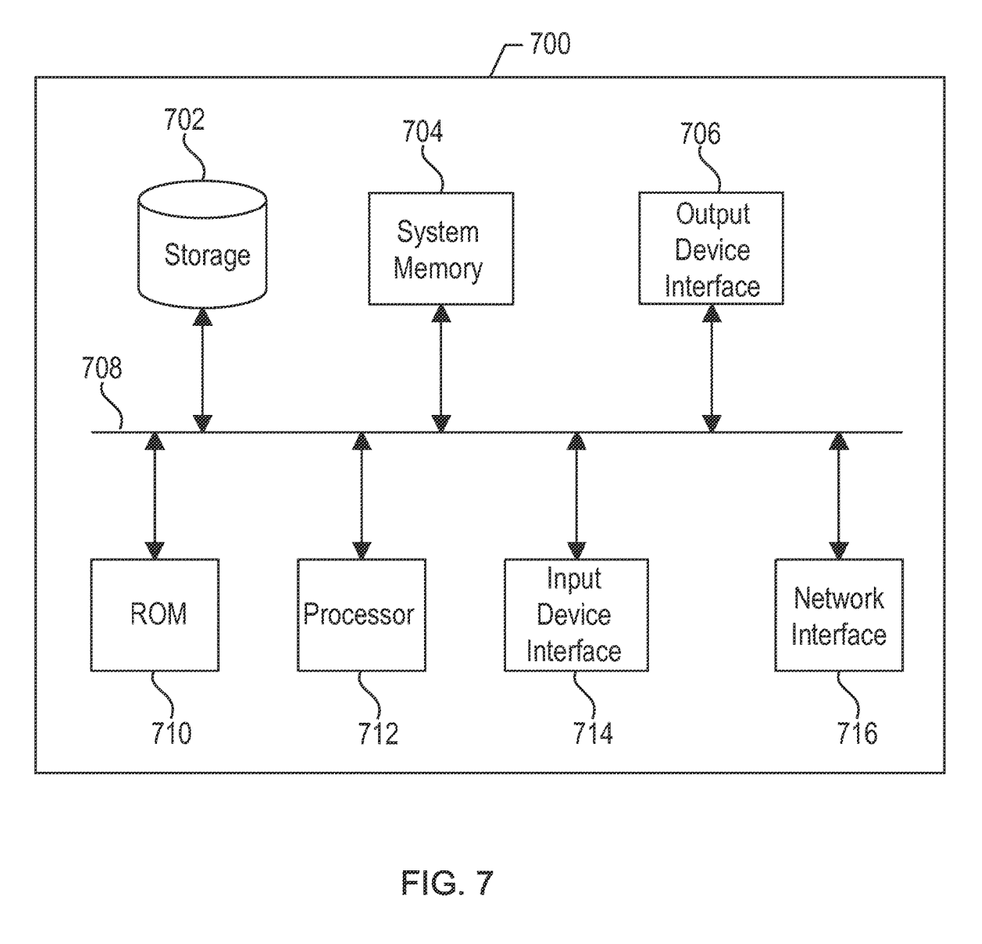
FIG. 7 conceptually illustrates an example electronic system with which one or more implementations of the subject technology can be implemented.

FIG. 7 conceptually illustrates an example electronic system 700 with which one or more implementations of the subject technology can be implemented. The electronic system 700, for example, may be, or may include, one or more of the wireless devices 102, 110, 114, one or more wearable devices, a desktop computer, a laptop computer, a tablet device, a phone, and/or generally any electronic device. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are utilized by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory (RAM). The system memory 704 may store one or more of the instructions and/or data that the one or more processing unit(s) 712 may utilize at runtime. In one or more implementations, the processes of the subject disclosure are stored in the system memory 704, the permanent storage device 702, and/or the ROM 710. From these various memory units, the one or more processing unit(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. The one or more network interface(s) may include Bluetooth interface, a BLE interface, a Zigbee interface, an Ethernet interface, a Wi-Fi interface, a multimedia over coax alliance (MoCA) interface, a reduced gigabit media independent interface (RGMII), or generally any interface for connecting to a network. In this manner, electronic system 700 can be a part of one or more networks of computers (such as a local area network (LAN), a wide area network (WAN), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor circuit that is configured to:
      receive an advertising packet from a device over a first channel;
      generate, in response to receiving the advertising packet, a connection request packet that comprises control information for establishing a connection with the device over a second channel having a different frequency than the first channel;

encrypt and authenticate at least a portion of the connection request packet based at least in part on a connection entry key previously exchanged with the device, wherein an encrypted portion comprises timing information and a frequency hop synchronization packet;

transmit the at least partially encrypted connection request packet over the first channel; and establish the connection with the device over the second channel based at least in part on the control information of the connection request packet.

2. The device of claim 1, wherein the connection comprises a Bluetooth low energy (BLE) connection.

3. The device of claim 2, wherein the first channel comprises an advertising or data channel and the second channel comprises a data channel.

4. The device claim 1, wherein the at least one processor circuit is further configured to:

pair and bond with the device;

establish a secure link with the device upon completion of the pairing and bonding; and exchange the connection entry key, nonce, and counter start values with the device over the secure link prior to receiving the advertising packet.

5. The device of claim 1, wherein at least one processor circuit is further configured to:

encrypt and authenticate the at least the portion of the connection request packet based at least in part on the connection request packet and a counter value.

6. The device, of claim 5, wherein the at least one processor circuit is further configured to:

synchronize, with the device, the encrypting and authenticating based at least in part on the counter value.

7. The device of claim 1, wherein another portion of the connection request packet that is unencrypted comprises a public address of the device.

8. A method for secure connection establishment with a device, the method comprising:

receiving, over a first channel, a connection request packet comprising control information, wherein at least a portion of the connection request packet is encrypted, wherein an encrypted portion comprises timing information and a frequency hop synchronization packet;

decrypting and authenticating the at least the portion of the connection request packet based at least in part on a connection entry key previously exchanged with the device; and establishing, over a second channel having a different frequency than the first channel, a connection with the device based at least in part on the control information of the connection request packet.

9. The method of claim 8, further comprising:

transmitting an advertising packet to the device over the first channel, wherein the connection request packet is received in response to transmitting the advertising packet.

10. The method of claim 8, wherein the connection comprises a Bluetooth low energy (BLE) connection.

11. The method of claim 10, wherein the first channel comprises an advertising channel and the second channel comprises a data channel.

12. The method of claim 8, further comprising:

pairing and bonding with the device;

establishing a secure link with the device upon completion of the pairing and bonding; and exchanging the connection entry key with the device over the secure link prior to receiving the connection request packet.

13. The method of claim 8, wherein decrypting and authenticating the at least the portion of the connection request packet based at least in part on the connection entry key previously exchanged with the device comprises decrypting and authenticating the at least the portion of the connection request packet based at least on the connection entry key and a counter value.

14. The method of claim 13, further comprising:

synchronizing, with the device, the decrypting and authenticating based at least in part on the counter value.

15. The method of claim 8, wherein another portion of the connection request packet that is unencrypted comprises a public address of the device.

16. A computer program product comprising instructions stored in a tangible non-transitory computer-readable storage medium, the instructions comprising:

instructions to generate a packet, in response to receiving an advertising packet from a device over a first channel, the packet comprising control information for establishing a connection with the device over a second channel having a different frequency than the first channel;

instructions to encrypt and authenticate at least a portion of the packet based at least on a connection entry key and a counter value, wherein an encrypted portion comprises timing information and a frequency hop synchronization packet, wherein the connection entry key was previously exchanged with the device;

instructions to transmit the packet to the device over the first channel; and instructions to establish the connection with the device based at least in part on the information over the second channel.

17. The computer program product of claim 16, wherein the instructions further comprise:

instructions to bond and pair with the device;

instructions to establish an encrypted link with the device after bonding and pairing with the device; and instructions to exchange the connection entry key with the device over the encrypted link prior to encrypting and authenticating the at least the portion of the packet.

18. The computer program product of claim 16, wherein the device comprises a Bluetooth low energy device and the connection comprises a Bluetooth low energy connection.

19. The computer program product of claim 16, wherein another portion of the packet that is unencrypted comprises a public address of the device.

20. The computer program product of claim 16, wherein the packet is transmitted to the device over a Bluetooth low energy advertising channel and the connection is established with the device over a Bluetooth low energy data channel.

* * * * *